(12) United States Patent
Gonthier

(10) Patent No.: US 6,832,030 B2
(45) Date of Patent: Dec. 14, 2004

(54) NON-SINUSOIDAL OPTICAL FIBER FILTERS AND METHOD OF MAKING THE SAME

(75) Inventor: François Gonthier, Montreal (CA)

(73) Assignee: ITF Optical Technologies Inc., Montreal (CA)

( * ) Notice: Subject to any disclaimer, the term of this patent is extended or adjusted under 35 U.S.C. 154(b) by 127 days.

(21) Appl. No.: 10/380,708
(22) PCT Filed: Sep. 21, 2001
(86) PCT No.: PCT/CA01/01348
§ 371 (c)(1),
(2), (4) Date: Mar. 17, 2003
(87) PCT Pub. No.: WO02/27371
PCT Pub. Date: Apr. 4, 2002

(65) Prior Publication Data
US 2003/0180001 A1 Sep. 25, 2003

(30) Foreign Application Priority Data
Sep. 28, 2000 (CA) .............................................. 2321802

(51) Int. Cl.⁷ ........................... G02B 6/26; C03B 37/023
(52) U.S. Cl. .............................. 385/43; 385/28; 65/385
(58) Field of Search .............................. 385/43, 42, 45, 385/28; 65/385

(56) References Cited

U.S. PATENT DOCUMENTS

| 4,877,300 | A | * | 10/1989 | Newhouse et al. ............ 385/43 |
| 4,946,250 | A | * | 8/1990 | Gonthier et al. .............. 385/27 |
| 5,446,820 | A | * | 8/1995 | Ishikawa et al. .............. 65/385 |
| 5,694,512 | A | * | 12/1997 | Gonthier et al. ............ 385/140 |
| 5,708,740 | A |   | 1/1998 | Cullen .......................... 385/39 |
| 5,930,441 | A |   | 7/1999 | Betts et al. .................. 385/140 |
| 6,466,717 | B1 | * | 10/2002 | Gonthier ....................... 385/43 |
| 6,718,095 | B1 | * | 4/2004 | Gonthier ....................... 385/43 |
| 2002/0157422 | A1 | * | 10/2002 | Corio et al. .................. 65/385 |
| 2003/0002795 | A1 | * | 1/2003 | Fisher et al. .................. 385/37 |

FOREIGN PATENT DOCUMENTS

| CA | 1284282 | 5/1991 | ............ G02B/5/20 |
| EP | 0736784 | 10/1996 | ........... G02B/6/293 |
| WO | WO9739368 | 10/1997 | |
| WO | WO0041016 | 7/2000 | ........... G02B/6/293 |
| WO | WO0057224 | 9/2000 | ............ G02B/6/16 |

OTHER PUBLICATIONS

T.J. Brophy et al.; In–Line Singlemode Fibre Interferometer . . . ; Jul. 8, 1993; pp. 1276–1277; Electronic Letters.
D.A. Nolan et al.; Tapered Lattice Filters; Feb. 21, 1999; pp. 85–87; Optical Fiber Communication Conference; San Diego, CA.

* cited by examiner

Primary Examiner—Brian Healy
Assistant Examiner—James P. Hughes
(74) Attorney, Agent, or Firm—George J. Primak

(57) ABSTRACT

An optical fiber filter (25) with a non-sinusoidal wavelength response is produced by forming an adiabatic taper in a single mode fiber (10) and forming non-adiabatic tapers (18, 20) on slopes at each end of the elongated central region of this adiabatic tape and in the middle of the central region (12). The non-adiabatic taper (22) in the middle of the central region (12) produces a phase shift in the wavelength response leading to non-sinusoidal filtering characteristics. The filter may be combined with a Mach-Zehnder interferometer to produce a Mach-Zehnder device with a non-sinusoidal wavelength response.

7 Claims, 5 Drawing Sheets

NON-SINUSOIDAL OPTICAL FIBER FILTERS AND METHOD OF MAKING THE SAME

BACKGROUND OF THE INVENTION

1. Field of the Invention

This invention relates to tapered optical fiber filters with a non-sinusoidal wavelength response.

2. Description of the Prior Art

PCT international publication No. WO 00/41016 describes an optical fiber filter which produces a predetermined sinusoidal response in amplitude and wavelength period of the filter. Such filter comprises an essentially adiabatic taper in a single mode fiber, which taper has an elongated central zone with a sloped portion at each end, and on each slope of the adiabatic taper, there is provided a non-adiabatic taper. This leads to the formation of two coupling regions at the extremities of the central zone, which produce a predetermined sinusoidal response in amplitude and wavelength period of the filter.

The above filter works very well for a sinusoidal Mach-Zehnder response. However, more complex, non-sinusoidal responses may also be desirable, because with a purely sinusoidal response, the bandwidth decreases as the period of the filter decreases, leading to a situation where the bandwidth is too narrow and the laser must be extremely well controlled in wavelength and is limited in its modulation frequency.

It is therefore advantageous in some cases to flatten the apex of the bands produced by the optical fiber filter in order to increase the bandwidth of the transmission band and thereby allow satisfactory laser operation and improved isolation.

In U.S. Pat. No. 5,930,441 such more complex non-sinusoidal filtering characteristics are achieved in a split-beam Fourier filter by a special plate distribution positioned between two lenses glued to the ends of respective optical fibers. This is a fairly complex arrangement specifically adapted to a Fourier filter. Such filtering characteristics may also be achieved using all-fiber devices by concatenating several sine filters as disclosed in PCT application PCT/CA00/00250. In accordance with the present invention, ways are provided of designing a complex filter that has the function of flattening the passband of the sinusoidal wavelength response, using a single component with an integrated multi-taper approach.

OBJECTS AND SUMMARY OF THE INVENTION

It is an object of the present invention to provide a non-sinusoidal optical fiber filter.

Another object of the invention is to obtain such filter by a simple and efficient method of tapering an optical fiber.

Yet another object of this invention is to provide an optical filter that has a periodic response that matches a periodic sine response of an all-fiber Mach-Zehnder interferometer that will flatten the optical passband of the Mach-Zehnder response and add isolation.

Other objects and advantages of the invention will become apparent from the following description thereof.

In essence, the optical fiber filter of the present invention comprises an adiabatic taper in a single mode fiber, having an elongated central zone with a sloped portion at each end thereof, thereby forming a slope at each extremity of the central zone, a non adiabatic taper on each slope adapted to produce a predetermined wavelength response in the filter, and a non-adiabatic taper in the middle of the elongated central zone adopted to produce a predetermined mode coupling and phase shift in said response resulting in desired non-sinusoidal filtering characteristics. The non-adiabatic taper in the middle of the central zone is preferably so located that the phase shift on each side thereof is essentially identical. The non-sinusoidal filtering characteristics are controlled by adjusting the widths of the non-adiabatic tapers relative to each other.

The optical fiber filter of the present invention is therefore substantially the same as disclosed in PCT international publication No. WO 00/41016, but with the additional provision of a non-adiabatic taper in the middle of the central zone, which provides the desired phase shift and mode coupling effect, resulting in a predetermined non-sinusoidal wavelength response.

The preferred method of manufacturing such non-sinusoidal filter comprises:

(a) producing an essentially adiabatic taper in a single-mode fiber, said taper having an elongated central zone with a sloped portion at each end thereof;

(b) forming a non-adiabatic taper on one sloped portion to produce a predetermined coupling region in said sloped portion;

(c) forming a non-adiabatic taper in the middle of the central zone to produce a coupling region in said central zone with a desired phase shift relative to the coupling region in the sloped portion produced in (b) above; and (d) forming a non-adiabatic taper on the sloped portion at the other end of the central zone to produce a coupling region which is essentially the same as the coupling region produced in (b) above and with a phase shift from the coupling region in the middle of the central zone being essentially the same as produced in (c) above.

Additional steps may be performed to fine-tune or adjust the widths of the non-adiabatic tapers relative to each other to achieve the final desired non-sinusoidal wavelength response.

As already described in the above mentioned PCT international publication No. WO 00/41016, the adiabatic taper is normally produced by approaching a torch with a flame to a section of the single-node fiber stripped of its protective jacket, and having the flame brush this section over a predetermined length while pulling both ends of the fiber until a desired reduction in diameter (preferably about 50%) is obtained in the central zone.

The non-adiabatic tapers on each slope and in the middle of the central zone are formed by approaching a torch with a small flame to a predetermined spot on each slope and in the middle of the elongated zone, and slowly pulling both ends of the fiber until power has decreased to a desired value, and repeating this procedure for each non-adiabatic taper.

The non-adiabatic tapers are produced so as to achieve a desired power splitting at both ends and in the middle to form a desired non-sinusoidal profile.

BRIEF DESCRIPTION OF THE DRAWINGS

A preferred embodiment of the invention will now be described with reference to the appended drawings in which.

DETAILED DESCRIPTION OF THE PREFERRED EMBODIMENT

Figure 1:
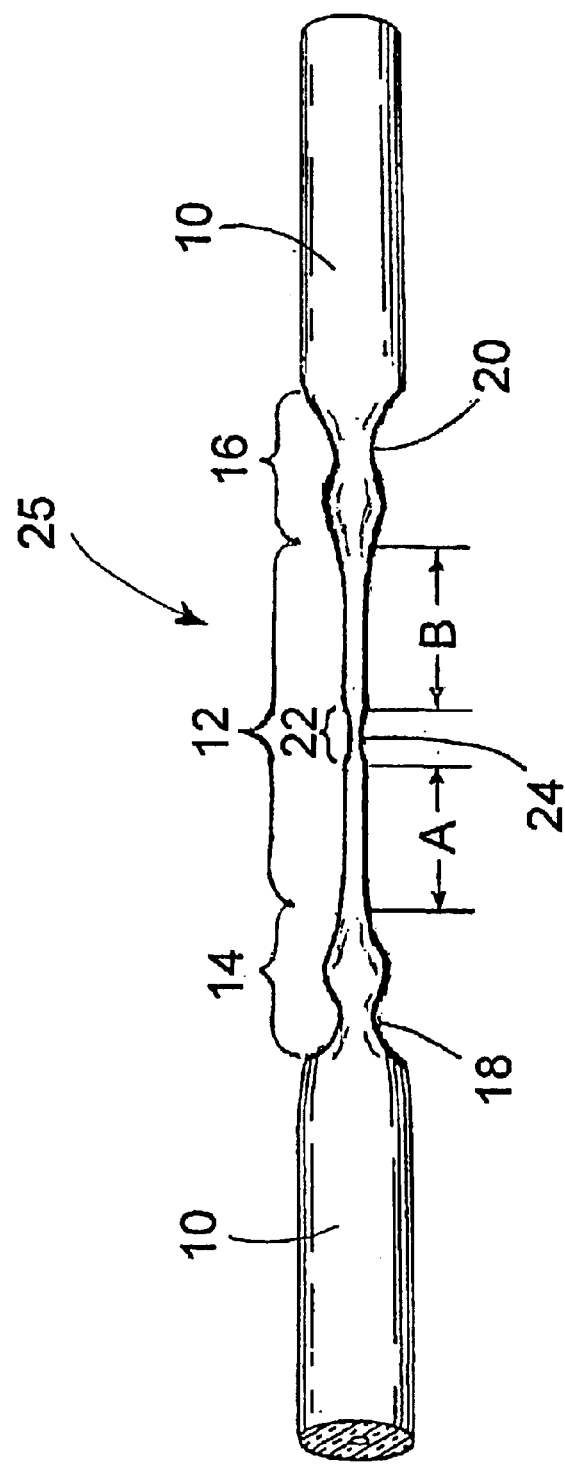
FIG. 1 is a perspective view of the filter in accordance with the present.

Referring to the drawings, in which the same elements are designated by the same reference numbers, FIG. 1 illustrates the structure of the filter 25 of the present invention which has a central beating region or zone 12 produced by an adiabatic taper, and two coupling regions 14, 16 at its extremities, produced by non-adiabatic tapers 18, 20. In addition, in accordance with this invention, a third coupling region 22 is provided in the middle of the central region 12, produced by a non-adiabatic taper 24.

The distances A and B between the coupling regions 14 and 22 and 16 and 22 respectively represent the phase shifts that produce the desired non-sinusoidal response. These distances are preferably essentially identical so as to provide substantially the same phase shift on both sides of the central coupling region 22. This structure is formed on a single-mode optical fiber 10, which can be any single mode fiber provided with a core, a cladding and a protective jacket.

Figure 2:
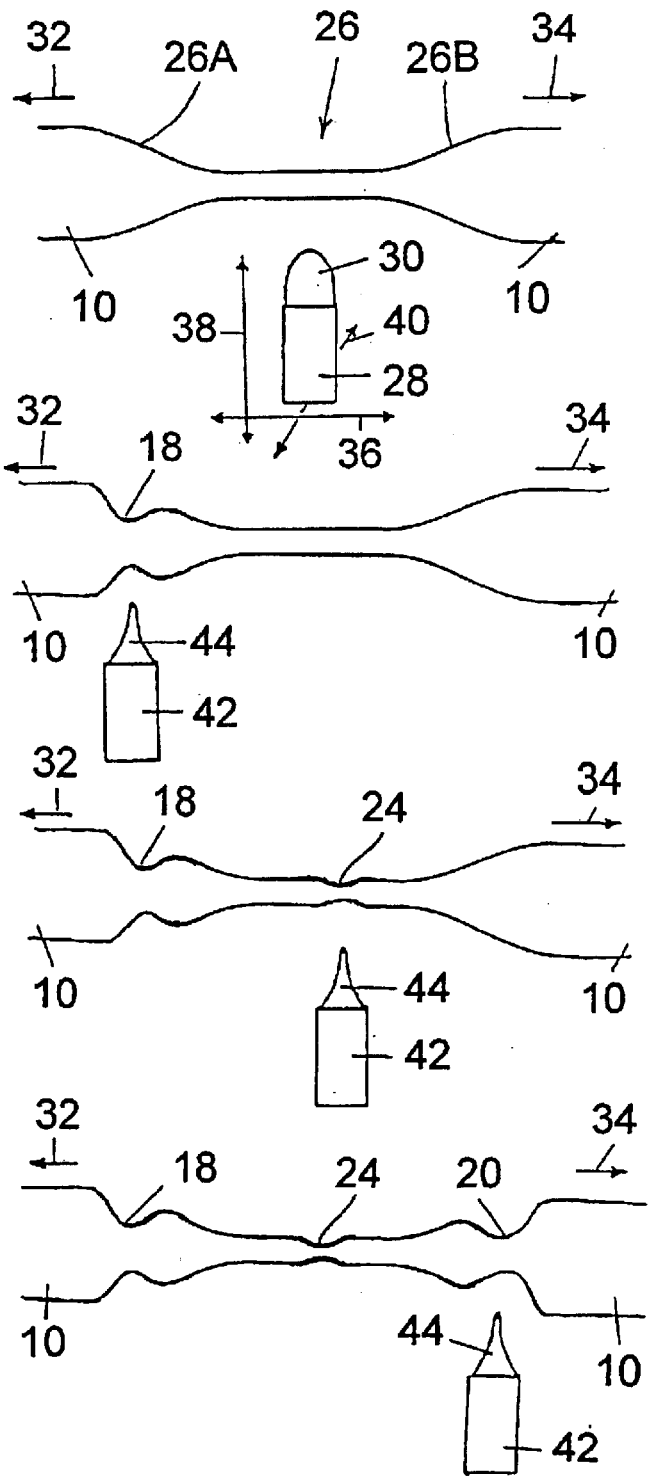
FIGS. 2a to 2d illustrate the basic steps of the method for producing the filter of the present invention.

The basic steps of producing the novel filter 25 of the present invention are illustrated in FIGS. 2a, 2b, 2c and 2d. The first step is shown in FIG. 2a and consists of making a long (e.g. 40 mm) essentially adiabatic taper 26 on the fiber 10, by approaching torch 28 with flame 30 to the fiber 10 and brushing the torch longitudinally until the fiber 10 is soft. In this region, fiber 10 has been stripped of its protective jacket prior to approaching torch 28 thereto. Upon softening, fiber 10 is pulled as illustrated by arrows 32, 34 to create a desired reduction in diameter, for example of about 50%. To provide suitable heating, flame 30 is adapted to move in all three axial directions as illustrated by arrows 36, 38 and 40. This enables the flame 30 to brush a suitable length of the fiber 10 to allow formation of the desired adiabatic taper 26 with slopes 26A and 26B, i.e. a taper that does not cause higher order cladding modes to be excited, keeping all the transmission power constant in the fundamental mode. Once the adiabatic taper 26 is finished, the spectrum analyser used to verify the same will indicate that there is no coupling, the transmission being at 0 dB.

Additional fabrication steps are used to create conditions at the extremities of the adiabatic taper 26 to excite the LP01 and LP02 modes in a controlled fashion and further to provide a coupling in the middle in such excitation as to produce a non-sinusoidal response. This is realized as shown in FIG. 2b, by first forming a non-adiabatic taper 18 at one end of fiber 10 using a small flame 44 on torch 42 with no brushing. To achieve the appropriate coupling value, the non-adiabatic taper 18 is produced by slowly pulling the fiber 10 at each end as shown by arrows 32, 34 and is positioned on the slope 26A. In the present example, it has been found advantageous to form taper 18 on the portion of slope 26A where the diameter of the slope is between 65 and 70% of the diameter of the fiber. In this embodiment, a coupling value of 1.5 dB may thus be achieved in the middle of the wavelength range of operation which is 1530 to 1565 nm.

The next step is illustrated in FIG. 2c and involves using a small flame 44 on torch 42 to form a non-adiabatic taper in the middle of the adiabatic taper 26. It is again formed by slowly pulling the fiber 10 at each end as shown by arrows 32, 34 to create a desired coupling in this place. Thus, in this embodiment, a coupling of 1.5 dB may be so achieved. This results in a component that has a sine response with a contrast of about 8 dB.

The following step is shown in FIG. 2d and involves formation of taper 20 on slope 26B essentially in the same manner as that of taper 18. Again a small flame 44 on torch 42 is used without brushing, and the fiber 10 is slowly pulled as shown by arrows 32, 34 to achieve a desired coupling of, for example 0.5 dB. The distance between tapers 18 and 24 and 20 and 24 should be essentially the same. This causes a rapid modulation to appear on the previously sinusoidal response.

In addition to the above basic steps, some further adjustment steps may be employed, for example to slightly elongate the structure on one or both sides of the central coupling 24 to achieve a predetermined wavelength response. The appropriate phase matching between the two sections of the taper structure is such that the rapid oscillation creates a dip at the peak of the sine response and increases the insulation in the valley.

Figure 3:
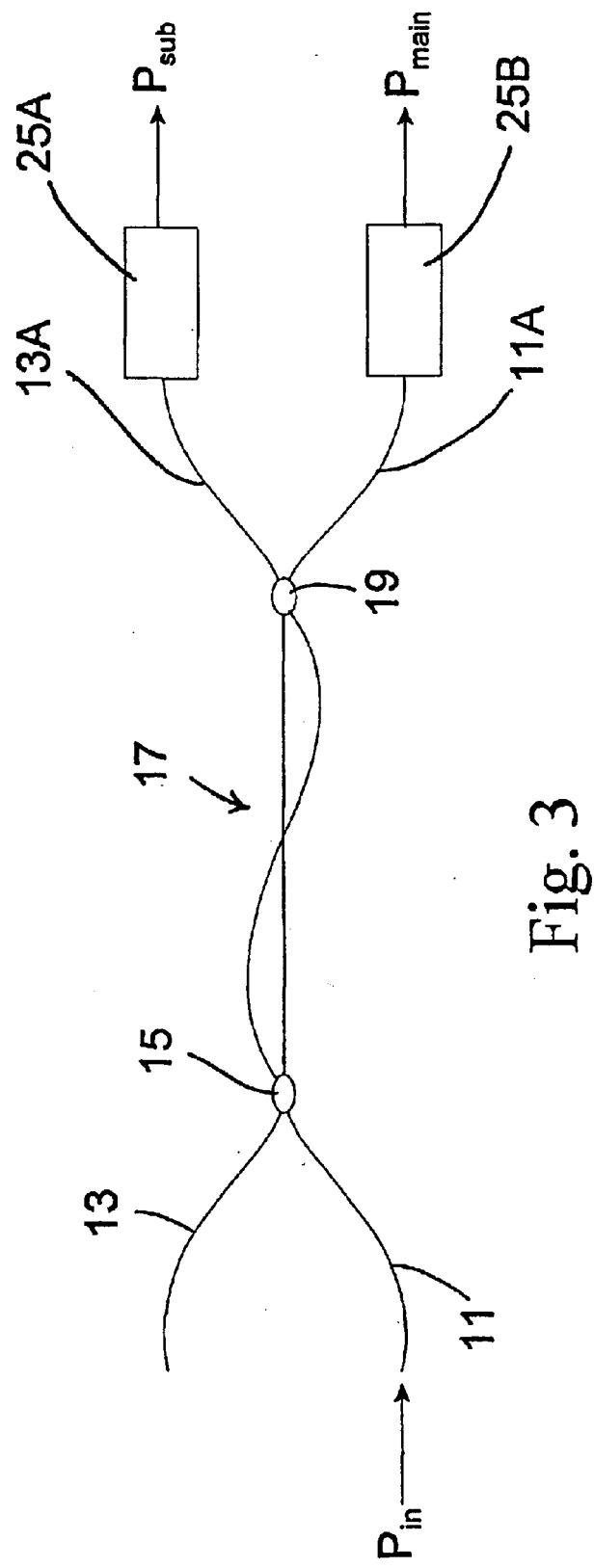
FIG. 3 is a diagrammatic representation of a Mach-Zehnder interferometer arrangement with filters of the present invention provided therein.
Figure 4:
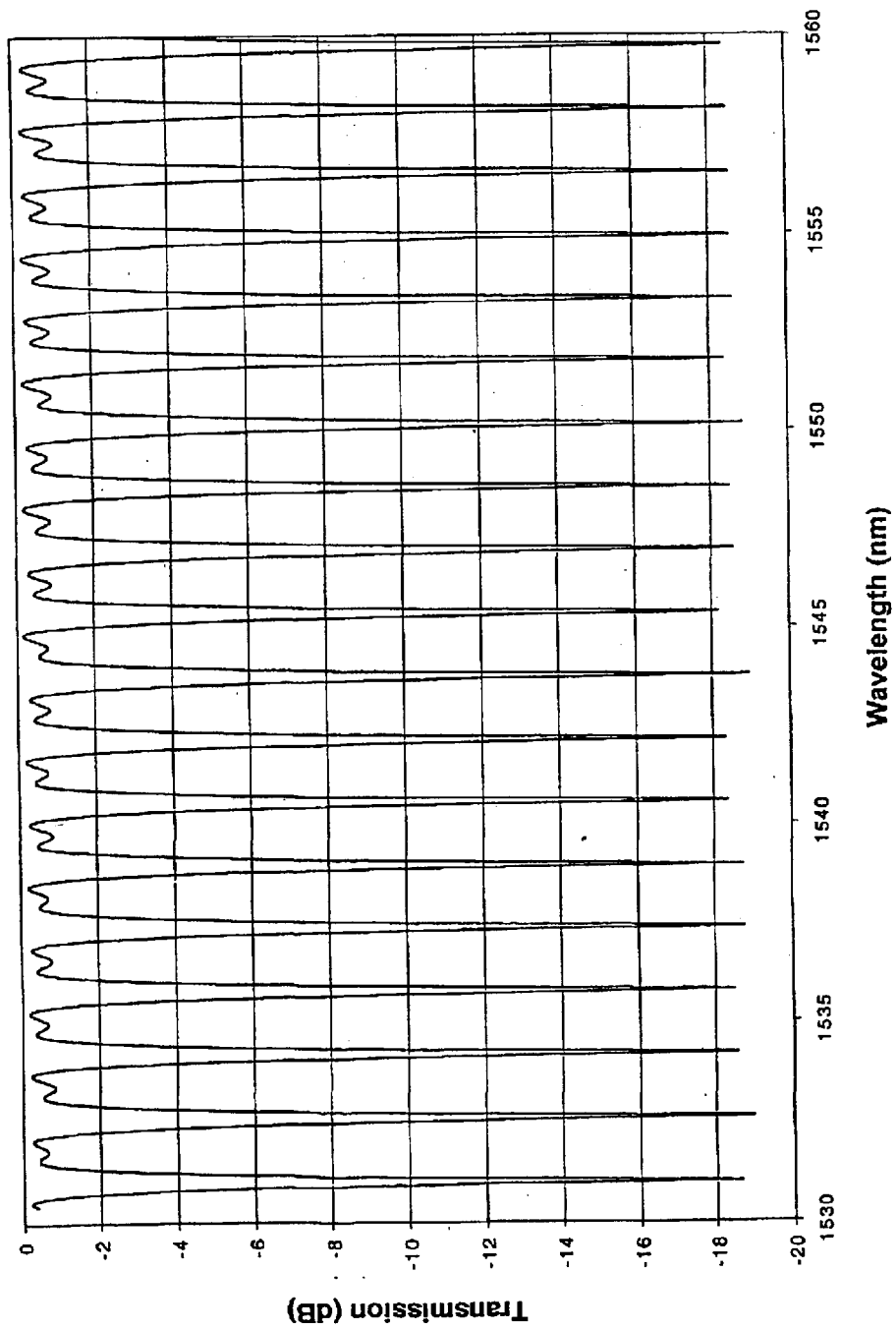
FIG. 4 is a graph showing a curve of transmission power vs wavelength of a filter of the present invention.

FIG. 3 illustrates the use of the filter of the present invention with a Mach-Zehnder interferometer to flatten the apex of the sinusoidal curves produced with the Mach-Zehnder. In this figure, input fiber 11, 13 enter a first coupler 15. Power $P_{in}$ is projected through fiber 11 and is split by the interferometer 17 ending with the second coupler 19 from which output fibers 11A and 13A exit. These output fibers constitute the main output port $P_{main}$ and a sub-output port $P_{sub}$. It is in the output fibers of such Mach-Zehnder interferometer that filters 25A and 25B of the present invention are provided to obtain a non-sinusoidal wavelength response.

Figure 5:
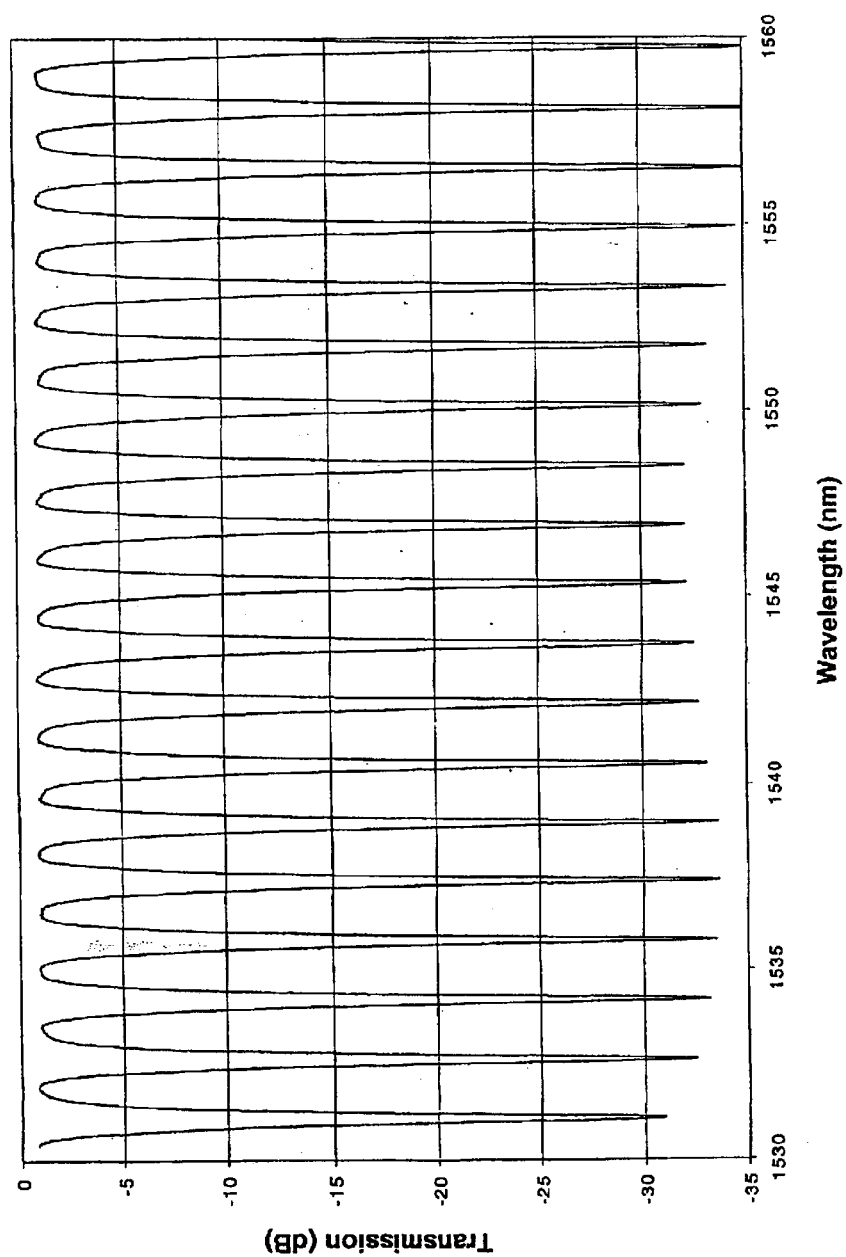
FIG. 5 is a graph showing a curve of transmission power vs wavelength of a Mach-Zehnder interferometer with a filter of the present invention incorporated to its structure.

The actual response of the filter 25 itself is illustrated in FIG. 5 which shows that, at the apex, it produces a dip rather than a flat. However, when combined with the purely sinusoidal response of the Mach-Zehnder interferometer, the peaks are flattened, as shown in FIG. 5.

It should be understood that the invention is not limited to the specifically described and illustrated embodiment but may comprise various modifications obvious to those skilled in the art.

What is claimed is:

1. An optical fiber filter with a non-sinusoidal wavelength response which comprises all adiabatic taper in a single mode fiber; said taper having an elongated central zone with a sloped portion at each end thereof, thereby forming a slope at each extremity of the central zone; a non-adiabatic taper on each slope adapted to produce a predetermined sinusoidal wavelength response in the filter; characterized in that there is also provided a non-adiabatic taper in the middle of the elongated central zone adapted to produce a predetermined mode coupling and phase shift that has the function of flattening the passband of the sinusoidal wavelength response.

2. An optical fiber filter according to claim 1, in which the non-adiabatic taper in the middle of the central zone is so positioned so as to produce an essentially identical phase shift on each side thereof.

3. An optical fiber filter according to claim 1, in which the non-sinusoidal wavelength response is controlled by adjusting the distances between the non-adiabatic taper in the middle of the central zone and the non-adiabatic tapers at each extremity of the central zone.

4. An optical fiber filter according to claim 1, which is combined with a Mach-Zehnder interferometer to form a Mach-Zehnder device with a non-sinusoidal wavelength response.

5. A method of manufacturing a fiber filter with a non-sinusoidal wavelength response having a flattened passband which comprises:

(a) producing an adiabatic taper in a single-mode fiber, said taper having an elongated central zone with a sloped portion at each end thereof;

(b) forming a non-adiabatic taper on one sloped portion to produce a predetermined coupling region in said sloped portion;

(c) forming a non-adiabatic taper in the middle of the central zone to produce a coupling region in said central zone with a desired phase shift relative to the coupling region produced in (b) above; and (d) forming a non-adiabatic taper on the sloped portion at the other end of the central zone to produce a coupling region which is essentially the same as the coupling region produced in (b) above and with a phase shift from the coupling region in the middle of the central zone being essentially the same as produced in (c) above.

6. A method according to claim 5, further comprising adjusting the distances between the non-adiabatic taper in the middle of the central zone and the non-adiabatic tapers at each end of the central zone to fine-tune the non-sinusoidal wavelength response of the filter.

7. A method according to claim 5, further comprising combining the fiber filter with each output fiber of a Mach-Zehnder interferometer to produce a Mach-Zehnder device with a non-sinusoidal wavelength response.

* * * * *